(No Model.)
R. G. SNEATH.
ANHYDROUS AMMONIA PURIFIER.
No. 524,567. Patented Aug. 14, 1894.
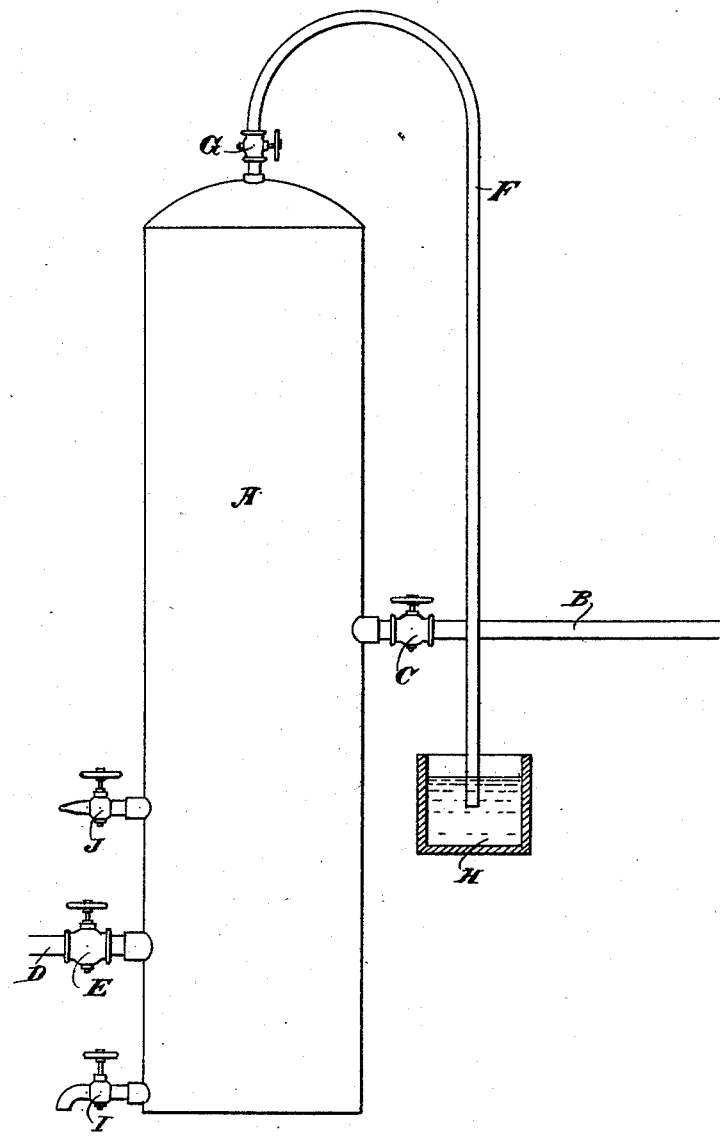
Witnesses,
Inventor,
Richard G. Sneath
By Dewey & Co.
Attys

UNITED STATES PATENT OFFICE.

RICHARD G. SNEATH, OF SAN FRANCISCO, CALIFORNIA.

ANHYDROUS-AMMONIA PURIFIER.

SPECIFICATION forming part of Letters Patent No. 524,567, dated August 14, 1894.

Application filed March 28, 1894. Serial No. 505,455. (No model.)

*To all whom it may concern:*

Be it known that I, RICHARD G. SNEATH, a citizen of the United States, residing in the city and county of San Francisco, State of California, have invented an Improvement in Anhydrous-Ammonia Purifiers; and I hereby declare the following to be a full, clear, and exact description of the same.

My invention relates to an apparatus which is especially adapted for the purification of anhydrous ammonia under pressure, either during the manufacture, or while in use.

It consists in certain details of construction which will be more fully explained by reference to the accompanying drawing, in which the figure is an elevation of my apparatus showing the pipes and cocks connected therewith.

In the use of anhydrous ammonia, and especially as illustrated in ice-making and refrigerating machines, the ammonia becomes gradually reduced in its effective action by becoming contaminated with light gases, or with water or heavier liquid, which in spite of all precautions, will become mixed with it and greatly interfere with the operation of the machines and reduce their capacity.

The object of my invention is to separate and draw off both the gases and the water by means of a simple connection with the pipes through which the liquefied ammonia is caused to travel while in a liquefied condition. At some point within the length of the pipe through which this ammonia passes is introduced a chamber A which is preferably cylindrical in shape, and may be of a proportion of seven feet in length by about twenty inches in diameter for a thirty-two ton ice machine. This cylinder should be capable of resisting a hydraulic pressure of about three hundred pounds to the square inch, and is preferably made of mild steel. It may be placed at any suitable or desirable point in the length of the pipe conveying the anhydrous ammonia under a pressure sufficient to keep it in a liquid form.

B is the inlet pipe through which the ammonia reaches the chamber, and C is a cock controlling its admission to the chamber.

D is the outlet pipe, having also a controlling cock as shown at E.

F is a pipe leading out from the top of the chamber A and provided with the controlling cock G at its junction with the chamber.

H is a vessel of any suitable description containing distilled water, into which the pipe F dips at its discharge end.

I is a discharge cock at the bottom of the chamber A and J is another cock situated higher up serving as a test cock to ascertain the condition of the ammonia within the chamber.

The operation of the apparatus will then be as follows: The anhydrous ammonia is delivered through the pipe B and cock C into the chamber A and passes therefrom through the pipe D. Within the chamber A any light gases which are not liquefied by pressure sufficient to liquefy the ammonia, will rise to the upper part of the chamber and are discharged therefrom from time to time, by opening the cock G which allows them to escape through the pipe F, and pass out through the water in the vessel H. This water serves to absorb and retain any ammonia vapor which may be discharged with the other gases, and the ammonia can afterward be recovered from it in the usual manner. In this manner any collection of undesirable gases, such as is described, can be drawn off and separated from the body of ammonia, which is thus kept clear and in good working condition at all times. If any water or other contaminating substance heavier than the ammonia collects therein, it is drawn off by means of the cock I at the bottom of the chamber A, and in the same manner as described for the pipe F any ammonia which may be drawn off at the same time, may be received in a body of water and afterward recovered therefrom.

The cock J serves to show the condition of the contents of the chamber from time to time.

It will be manifest that the chamber A may be made of any suitable shape or size and placed in any desired position, but I have found that the form here shown of an elongated cylinder, standing in a vertical position, gives the best results, as it allows sufficient room for the lighter gases to rise and make a complete separation from the ammonia.

Having thus described my invention, what I claim as new, and desire to secure by Letters Patent, is—

1. In an apparatus for purifying ammonia, the combination of the members B and D of a line of pipe through which the ammonia passes, said members having the adjoining ends occupying different horizontal planes, and each having a controlling cock, a chamber vertically disposed between said adjoining ends of said pipes and extending above the level of the inlet member thereof to provide a space in the top of the chamber for gases which separate from the ammonia, a pipe leading from the upper portion of said space and returned to a point below the entrance of the inlet member B of said line of pipe, and having a controlling cock, and a draw-off cock below the outlet member D of said line of pipe through which heavy substances may be delivered.

2. In an apparatus for purifying ammonia, the combination, of the members B and D of a line of pipe through which the ammonia passes, said members occupying different horizontal planes, and each having a controlling cock, a chamber interposed between the adjoining ends of said pipes and extending above the level of the inlet member thereof to provide a space in the top of the chamber for gases which separate from the ammonia and accumulate in the space, a pipe leading from the space in the top of the chamber and returned to a point below said space, and having a controlling cock, and a test cock between the inlet and outlet members of the line of pipe.

In witness whereof I have hereunto set my hand.

RICHARD G. SNEATH.

Witnesses:
S. H. NOURSE,
J. A. BAYLESS.